United States Patent [19]

Marquet

[11] Patent Number: 5,264,852

[45] Date of Patent: Nov. 23, 1993

[54] SATELLITE EQUIPMENT FOR MEASURING THE BACKSCATTER COEFFICIENT OF THE SEA

[75] Inventor: Dominique Marquet, Grepiac, France

[73] Assignee: Alcatel Espace, Courbevoie, France

[21] Appl. No.: 824,229

[22] Filed: Jan. 22, 1992

[30] Foreign Application Priority Data

Jan. 22, 1991 [FR] France ................. 91 00678

[51] Int. Cl.$^5$ ................. G01S 13/95; G01S 13/58
[52] U.S. Cl. ................. 342/26; 342/460; 342/25; 342/117
[58] Field of Search ........... 342/26, 25, 104, 117, 342/460, 461

[56] References Cited

U.S. PATENT DOCUMENTS

| | | | |
|---|---|---|---|
| 3,617,995 | 11/1971 | Goulet | 342/113 X |
| 4,172,255 | 10/1979 | Barrick et al. | 342/26 |
| 4,286,462 | 9/1981 | Bourne | 342/26 X |
| 4,355,311 | 10/1982 | Jain | 342/25 |
| 4,499,470 | 2/1985 | Stacey | 342/352 |
| 4,633,255 | 12/1986 | Trizna | 342/192 |
| 4,675,677 | 6/1987 | von Maydell et al. | 342/25 |
| 4,724,418 | 2/1988 | Weirdling | 342/25 |
| 4,746,923 | 5/1988 | Schwartz et al. | 342/117 |
| 4,748,448 | 5/1988 | Thompson | 342/26 |
| 4,758,838 | 7/1988 | Maeda et al. | 342/25 |
| 4,829,306 | 5/1989 | Gjessing et al. | 342/159 |
| 4,914,734 | 4/1990 | Love et al. | 342/64 |
| 4,922,254 | 5/1990 | Schuessler et al. | 342/25 |
| 4,965,582 | 10/1990 | Hellsten | 342/25 |
| 4,989,008 | 1/1991 | Fujisaka et al. | 342/25 |
| 4,990,922 | 2/1991 | Young et al. | 342/52 |
| 4,996,533 | 2/1991 | May et al. | 342/108 |
| 5,057,843 | 10/1991 | Dubois et al. | 342/25 |
| 5,059,966 | 10/1991 | Fujisaka et al. | 342/25 |
| 5,091,749 | 9/1991 | Stoyle | 342/25 |

OTHER PUBLICATIONS

IGARSS 90 IEEE, vol. 3, May 24, 1990, Maryland, USA, pp. 2455-2458, D. J. Q. Carter: 'A proposed wind scatterometer pulsed CW design for the first European polar platform'.
IGARSS 90 IEEE, vol. 3, May 24, 1990, Maryland, USA, pp. 2451-2454; H. R. Schulte; J. Weber: "A novel wind scatterometer design employing frequency modulated pulses".
IGARSS 90 IEEE, vol. 3, May 24, 1990, Maryland, USA, pp. 2081-2084; D. Carter; S. Austin: "European space agency's remote sensing satellite (ERS1) active microwave instrumentation (AMI) flight model performance".
IEEE Transactions on Geoscience and Remote Sensing, vol. 26, No. 6, Nov. 1, 1988, New York, N.Y., USA, pp. 869-878; D. Long; C. Chi; F. Li: 'The design of an onboard digital doppler processor for a spaceborne scatterometer'.
IGARSS 86 IEEE GRSS, vol. 1, Aug. 1, 1986, Paris, France, pp. 389-394; P. Hans; H. Munz et al.: 'Quasi real time conversion of ERS1 scatterometer raw data to SO triplets'.
EASCON 87 IEEE, Oct. 16, 1987, Washington, D.C., USA, pp. 177-183; Y. Hara; K. Tachi et al.: 'Digital Doppler filter design for the spaceborne wind scatterometer'.
IEEE TGRS 26, vol. 26, No. 5, Sep. 1, 1988, New York, N.Y., pp. 532-539; N. S. Pillai, A. M. Jha: 'A spaceborne LFM scatterometer for ocean surface wind vector measurement; a time domain approach'.

Primary Examiner—John B. Sotomayor
Attorney, Agent, or Firm—Sughrue, Mion, Zinn, Macpeak & Seas

[57] ABSTRACT

Satellite radar apparatus measures the backscatter coefficient of the sea to determine the speeds and directions of winds at sea. The apparatus implements three aiming directions per swath with the track thereof on the Earth being parallel. The radar technique used operates by pulse compression, and on reception noise is measured in parallel with the measurement of signal plus noise. The apparatus includes an assembly for calibrating the product of transmission power multiplied by reception gain, which assembly includes a servo-control loop connected to the transmission line via a directional coupler.

7 Claims, 2 Drawing Sheets

SATELLITE EQUIPMENT FOR MEASURING THE BACKSCATTER COEFFICIENT OF THE SEA

The present invention relates to apparatus for use on board a satellite for measurinig the backscatter coefficient of the sea to determine the speeds and directions of winds at sea.

BACKGROUND OF THE INVENTION

It is known that the backscatter coefficient from a radar wave transmitted at radiofrequency from a satellite and towards the sea can be measured in order to determine the speeds and the directions of winds at sea, with this so-called "Bragg" backscattering being highly influenced by wind in the short term.

In the short term, wind creates small waves or "crinkles" having a physical wavelength of the order of a few centimeters.

By using a radar wave transmitted from a satellite and of approximately the same wavelength, a resonance phenomenon is set up enabling the backscatter coefficient of the sea to be measured, which coefficient is itself highly dependent on short term wind.

To measure wind direction, it is necessary to provide a plurality of antennas on the satellite pointing along different azimuths, with there generally being two or three such antennas per "swath" (observation strip).

Most known apparatuses provide two or three antennas per swath, generally:

a "front" antenna whose track on the Earth is directed at an angle of 45° forwards from the satellite;

a "middle" antenna whose track on the Earth is perpendicular to the Earth track of the satellite; and a "rear" antenna whose track on the Earth is directed symmetrically to the track of the front antenna relative to the track of the middle antenna, i.e. at 45° towards the rear.

Consequently, any given point on the swath is measured on three successive occasions at different angles of azimuth and incidence, these three occasions making it possible to resolve ambiguities between the direction and the amplitude of the short term wind at said point.

It is not absolutely essential to use three measurements per swath, and, for example, the American satellite "Seasat" uses only two, however that suffers from the drawback of making it more difficult to resolve the above-mentioned ambiguity concerning wind direction.

In addition to the "Seasat" implementation, the following known systems should be mentioned:

the "N Scatt" project designed for band Ku operation like the Seasat implementation, but using three measurements per swath;

the European Space Agency's current "ERS-1" and "ERS-2" implementations under the general name "A.M.I." that use three antennas per swath in association with short pulses that require high transmission power, with those two implementations sharing with a synthetic aperture radar (SAR) operating in band C; and SCATT-2 and two-swath AMI-2 projects which constitute improvements over the above systems while still not being optimal.

Apart from the two last-mentioned systems, those prior art systems require the use of high-power transmitter amplifiers using vacuum tubes, which are particularly bulky and unreliable. In addition, they are poorly or badly optimized for the function of measuring scatter. For example, the ERS-1 system requires a compromise to be made between radiometric resolution and three-dimensional resolution, and this compromise is achieved to the detriment of three-dimensional resolution. Since that system is also shared with an imaging SAR, it is not optimized for the scatter-measuring function, and it has a limited utilization rate. The use of vacuum tube amplifiers having high peak powers (5 kilowatts or more) gives rise to poor reliability and to risks of gaseous discharges or the "multipactor" effect in the waveguides associated with said amplifiers.

The present invention seeks to remedy these drawbacks and it provides satellite radar apparatus for measuring the backscatter coefficient of the sea to determine the speeds and the directions of winds at sea (with such apparatus commonly being called a "wind scatter meter"), the apparatus using three aiming directions per swath and being much better optimized than presently known apparatuses with respect to cost, performance, and platform resources (mass, power consumption), with the sole barriers that remain in practice being essentially due to the laws of physics and to the state of advance of technology.

SUMMARY OF THE INVENTION

To this end, the present invention provides a wind scatter meter of the above-specified type, i.e. having three radar aiming directions per swath, in which these three aiming directions define respectively:

a middle Earth track which is conventionally orthogonal to the Earth track of the satellite and which is situated in a vertical plane passing through the satellite;

a front Earth track which lies in a sloping plane passing through the satellite and situated in front of the plane containing the middle Earth track, the front Earth track being parallel to the middle Earth track; and a rear Earth track lying in another sloping plane passing through the satellite and situated behind the plane containing said middle Earth track, the rear Earth track likewise being parallel to the middle Earth track.

This advantageous characteristic makes it possible to increase the directivity of the antennas used for the front and rear Earth tracks, thereby increasing their gain, thus making it possible to reduce transmission power significantly and to increase pulse duration: the transmitter power amplifier can be an all solid-state amplifier without difficulty, i.e. it no longer requires vacuum tubes as do most known implementations.

In addition, the receiver portion preferably includes a noise measurement path which is distinct from the measurement path used for "signal-plus-noise", and which operates in parallel therewith, i.e. at the same time.

This provides a measurement of noise that is more accurate than before while still having a wide passband, a longer integration time, and specific calibration.

The recurrence frequency can be increased, thereby increasing the number of takes of the spatial resolution cell on the Earth, thereby improving measurement accuracy.

It is also advantageous to use a radar technique that operates by "pulse compression" with the satellite transmitting a "chirp" signal of determined duration with linear frequency modulation, and performing on-board "matched filter" type processing of the echo as received, thereby performing a well-known and well-defined mathematical correlation between the echo returned by the target and the transmitted signal in the same manner as is used in pulse compression acoustic filters, for example, with the correlation being performed on the transmitted signal after the appropriate time delay and optionally with a frequency offset (for the front and rear beams). Since this process is optimal, processing losses are negligible.

Finally, it is advantageous for apparatus of this type to use a novel sequential calibration assembly for the receiver system based on measuring the product of transmitted power multiplied by receiver gain, said assembly including a servo-control loop which receives a small fraction of the transmitted signal via a directional coupler placed at the outlet from the transmitter power amplifier, and which stores it in memory, and which similarly subsequently stores a calibration pulse after receiving the echo and before another transmission signal is present, the calibration pulse being identical to the transmission signal and having the same frequency, and being injected directly into said loop, said pulse nevertheless preferably being of lower power and being injected via an adjustable attenuator under the control of said loop, thereby adjusting the attenuation coefficient of the attenuator over successive steps that may occupy a plurality of successive transmission pulses, until the energy contents of the two stored values are equal, such that the looked-for product of transmitted power multiplied by receiver gain is given by the product of the power value due to said calibration pulse and as measured at the end of the receiver system after being injected directly into the receiver system via the directional coupler, as multiplied by twice the value in decibels of the coupling coefficient of the directional coupler.

BRIEF DESCRIPTION OF THE DRAWINGS

An embodiment of the invention is described by way of example with reference to the accompanying drawings, in which.

DETAILED DESCRIPTION

Figure 1:
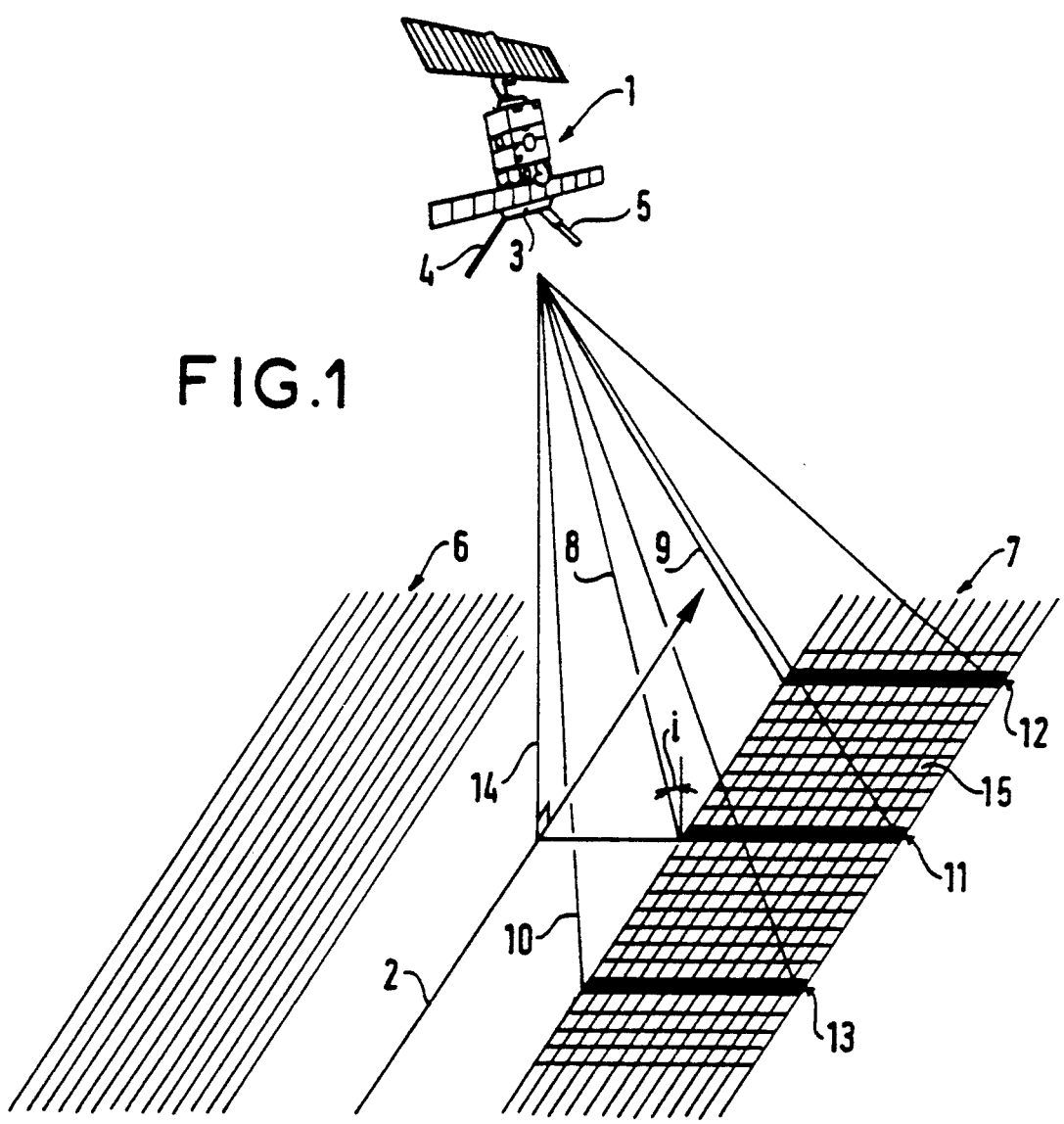
FIG. 1 is a perspective view showing the principles on which the apparatus operates.

With reference initially to FIG. 1, a satellite 1 orbits around the Earth at an altitude of about 800 km, and to a first approximation its Earth track 2 is rectilinear.

The satellite contains a radar transmitter/receiver, preferably operating in band C, for example, and provided with three electronic beam switching antennas 3, 4, and 5 which, in this particular embodiment, serve to transmit six beams towards the Earth (in particular in this case towards the sea) defining two swaths 6 and 7 parallel to the Earth track 2 and situated on opposite sides thereof. The width of each swath 6 and 7 may be about 550 km, for example.

In accordance with the invention, these three antennas generate three different aiming directions per swath, both for the right swath 7 and for the left swath 6:

a middle aiming direction 8 which is not novel per se, defining a middle Earth track 11 extending perpendicular to the Earth track 2 of the satellite and lying in a vertical plane 14 passing through the satellite 1;

a front aiming direction 9 which defines a front Earth track 12 occupying a sloping plane that includes the satellite 1 and that is situated in front of the plane 14, the front Earth track 12 being parallel to the middle Earth track 11; and a rear aiming direction 10 disposed symmetrically to the front aiming direction 9 about the above-mentioned vertical plane 14 and, as a result, defining a rear Earth track 13 situated behind the middle track 11, which is parallel thereto, and which is at the same distance therefrom as the front track 12: for example, the tracks 11 and 12 and the tracks 11 and 13 may be about 880 km apart, respectively.

In each antenna beam 8, 9, and 10, the satellite transmits radar waves towards successive points on each Earth track, respectively 11, 12, and 13, and it measures the intensity of the reflected wave received as an echo. This measurement is returned to Earth for appropriate treatment to deduce the corrected backscatter coefficient of the sea at each of the successive analysis points. Means are then calculated on the Earth within squares or rectangles 15 of predefined dimensions (e.g. 25 km by 25 km) constituting a checkerboard within each of the swaths 7 and 6.

Figure 2:
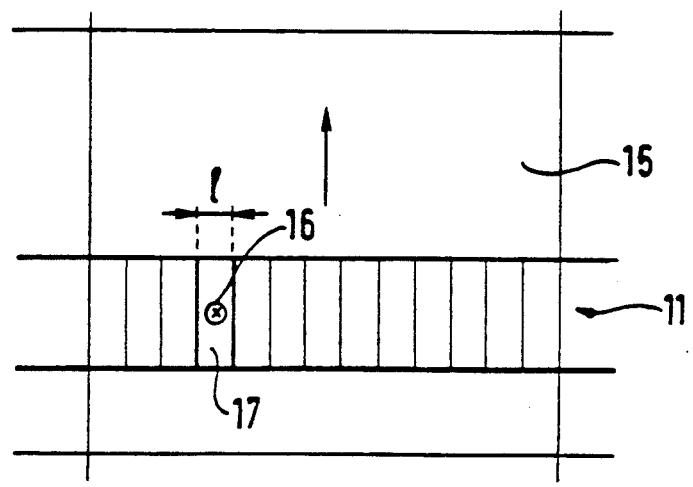
FIG. 2 is a magnified view showing one of the observation rectangles at sea as seen by a middle antenna and as marked in FIG. 1.

One such analysis rectangle or square 15 is shown enlarged in FIG. 2 where it is assumed that it is scanned from front to rear by the antenna track 11, for example, with the point under instantaneous analysis (i.e. the point being measured at a given instant) being designated by reference 16.

In accordance with an advantageous characteristic of the invention, a pulse compression radar technique is used based on that commonly employed for acoustic filters. Consequently, the signal transmitted from the satellite towards the Earth is not a narrow pulse, but a "chirp" signal constituted by a wave of constant amplitude, of determined duration, and modulated linearly in frequency. This wave has a passband of width B and with edges that are practically straight. It can be shown mathematically that by using a well-known equation to perform correlation between the echo wave as reflected and received by the satellite and the wave as transmitted (after an appropriate time delay and optionally with a frequency offset to compensate the Doppler effect), a narrow pulse is obtained of width equal to 1/B and of amplitude proportional to the locked-for back-scatter coefficient. It is also easily shown that the spatial resolution of the apparatus corresponds in the Earth track 11 of the antenna to a small rectangle 17 containing the present aiming point 16 and of width:

$$l = c/2B \cdot \sin i$$

where c is the propagation velocity of the radiowave, and i is the angle of incidence of the beam, as shown in FIG. 1.

Figure 3:
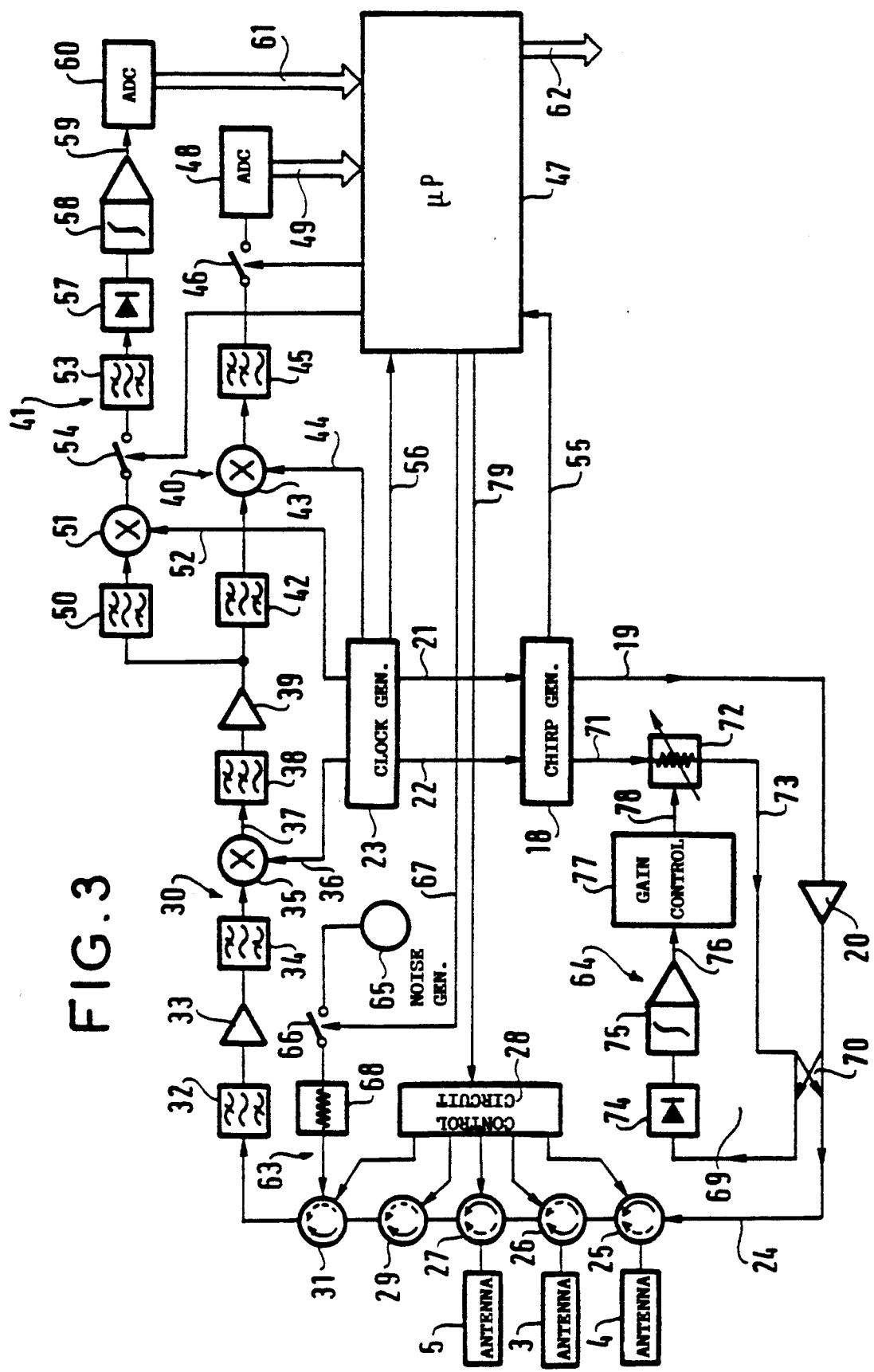
FIG. 3 is a simplified block diagram of the electronics on board the satellite for performing backscatter measurements.

FIG. 3 is a block diagram of the electronic apparatus on board the satellite 1 for transmitting radar waves to the Earth and for receiving reflections thereof, and also for measuring the amplitude of the peak obtained after correlation. As explained below, the apparatus also performs substantially permanent calibration of the noise-measuring system and of the receiver system.

With reference to FIG. 3, a generator 18 (preferably a digital generator) is suitable for generating a chirp signal on one of its outputs 19, which signal is applied to a power amplifier 20 that is advantageously constituted by a fully transistorized amplifier since only a few tens of watts are required on output. On inputs 21 and 22, the generator 18 receives respectively a clock signal and a fixed frequency radio signal from a local frequency generator 23.

The amplified chirp signal is applied to each of the transmit antennas 4, 3, and 5 via a link 24 and circulators 25, 26, and 27 under the control of a circuit 28, which antennas are switched to alternate between swath 6 and swath 7 by an electronic switching circuit (not shown). To clarify the description, only one of the swaths, e.g. swath 7, is taken into consideration as being illuminated by the apparatus shown in the circuit diagram.

In order to avoid leakage of transmission energy into the receiver portion, two additional circulators 29 and 31 are provided to act as a switch which is OFF during transmission and ON during reception.

The echo signal (which is still a chirp signal, but delayed in time and possibly offset in frequency) is received by the antenna system and is applied to the receive path 30 via the switch 29, 31 while said switch is ON.

The useful signal as received is small in amplitude and is completely buried in noise: the receiver system must therefore extract the useful signal from the noise.

The system 30 includes a first bandpass filter 32 suitable for eliminating interference close to the useful band of the signal. The signal is then amplified by a low-noise amplifier 33, after which it passes through a second bandpass filter 34 conventionally designed to obtain a frequency change to a single sideband, with the image frequency being eliminated.

A frequency change is then performed by means of a mixer 35 which receives the single sideband signal and which has an input 36 receiving a local frequency from the generator 23. The output signal 37 from the mixer 35 is an intermediate frequency signal at 200 MHz, for example.

After passing through a lowpass filter 38 conventionally designed to remove other mixing products and to reduce the noise band, this signal is amplified up to the desired level by means of an intermediate frequency amplifier 39 and it is then applied simultaneously to two measurement systems that operate in parallel:

a first system 40 measures the combined "signal-plus-noise" corresponding to the received echo; and a second system 41 measures noise only.

The system 40 begins with a bandpass filter 42 designed like above-mentioned filter 34 to eliminate the image frequency prior to a second frequency change for moving down to baseband. The second frequency change is performed by a mixer 43 which receives its local frequency from the generator 23 via its other input 44, after which the signal is passed through a new lowpass filter 45 which limits the signal band prior to the signal being sampled by a sampler 46 under the control of a microprocessor 47, thereby avoding problems due to spectrum folding (aliasing). The sampled signal is digitized by an analog-to-digital converter 48 and is transmitted to the microprocessor 47 over a digital link 49.

According to an original aspect of the invention, the noise measuring system 41 operates simultaneously with the system 40 and likewise includes a reduction in frequency using, as above, a bandpass filter 50 followed by a mixer receiving its local frequency via a second input 52.

A switch 54 under the control of the microprocessor 47 is held OFF during transmission and ON during reception. It should be observed that the transmission signal generator 18 includes an data link 55 connected to the microprocessor 47, and that the microprocessor 47 receives its clock signal from the generator 23 via a link 56.

A bandpass filter 53 serves to select the noise band that is to be measured, and the signal at the output from this filter is applied firstly to a detector 57 which measures the amplitude of the noise level, and then to an integrating amplifier 58. The integrated noise level available at the output 59 from the integrator is likewise digitized by an analog-to-digital converter 60 and is applied to the microprocessor 47 via a digital link 61.

The microprocessor 47 performs the mathematical "pulse compression" correlation between the received echo signal and the previously transmitted signal (as transmitted thereto over the link 55) and after applying appropriate time and frequency corrections thereto. This correlation operation provides a signal which corresponds to a narrow pulse of width 1/B, and having an amplitude which is proportional, in known manner, to the backscatter coefficient of the sea, which signal is transmitted to Earth via an outlet path 62 for processing in order to obtain the amplitude and the direction of the short term wind at each point as a function of successive data relating to each point and derived from the three tracks 12, 11, and then 13.

The installation on board the satellite further includes two particularly advantageous calibration systems: a noise calibration system 63 and a calibration system 64 for measuring the echo itself, i.e., in fact, for determining the varying product of transmission power multiplied by reception gain since the other factors that apply to measuring the backscatter coefficient are fixed in value. These two calibration systems may either operate on a continuous basis providing substantially continuous recalibration, or else they may operate sequentially, i.e. from time to time.

The noise calibration system 63 includes a noise generator 65 suitable for transmitting two noise levels of determined amplitudes in succession for calibration purposes, with the noise generator being followed by a static switch 66 under the control of an output 67 from the microprocessor 47, and then by a fixed value attenuator 68, with the two above-specified noise levels being delivered directly and solely to the receiver system 30 via a circulator switch 31 which is controlled for this purpose by the microprocessor 47 via a control link 79 and via the above-mentioned control circuit 28. The receiver system 30 responds via its system 41 and the link 61 by delivering two noise amplitude values to the microprocessor 47 as required for noise calibration, with the calibration operation per se naturally being performed on Earth (data being transmitted via the link 62).

The calibration system 64 for the receiver system 30 measures, in original manner, the product of transmission power Pe multiplied by reception gain Gr, where the magnitudes Pe and Gr are the only magnitudes likely, in practice, to vary.

This system 64 includes a sampled servo-control loop 69 which is coupled to the output line 24 from the transmission amplifier 20 via a waveguide directional coupler 70 having a coupling coefficient C that is defined and that is particularly stable. This loop is also fed sequentially via an output 71 of the generator 18 and an adjustable attenuator 72 with a chirp signal identical to that transmitted on the line 19, while preferably nevertheless being at a much lower level. The output 73 from the attenuator 72 passes as shown via the second branch of the coupler 70 (like the line 24 which passes through the first branch thereof), and it feeds a detector 74 followed by an integrator-amplifier 75 whose output signal 76 is applied to a simple circuit 77 for storing and automatically controlling gain and which has an output 78 that acts on the variable attenuator 72.

This calibration system 64 operates as follows:

When a chirp signal is transmitted towards the Earth, a small portion of this signal equal to the power Pe attenuated by C decibels is taken from the output 24 of the amplifier 20 by the coupler 70, is detected and integrated by the circuits 74 and 75 of the loop 69, and is stored in the circuit 77.

After the echo has been received and before a new chirp signal is sent over the link 19, a chirp signal is re-transmitted directly into the loop 69 via the above-mentioned output 71 of the generator 18. This signal, which has the same frequencies and the same shape as the transmitted signal, is likewise detected at 74, integrated at 75, and stored in the circuit 77, which circuit responds via its output 78 to adjust the attenuator 72 so that on the following occasion equal amplitudes are obtained for the two stored signals (transmitted at the output 19 and picked up by the circuit 77, and as re-transmitted by the output 71 and picked up in the same manner). It may happen that these signals stored in this way in the circuit 77 achieve equal amplitude only after a plurality of successive automatic gain control operations via the control output 78.

When the two signals stored in the circuit 77 (i.e. the fraction of the transmission signal sampled by the coupler 70 and the signal as re-transmitted at the output 71 and appropriately attenuated by the adjustable attenuator 72 under the control of the sevo-control loop 69) are exactly equal, then the re-transmitted signal present on the link 73 is injected in parallel over the link 24 via the coupler 70 (which therefore attenuates it by C decibels), and is applied directly and solely to the reception system 30, with the circulators 25, 26, 27, 29, and 31 being appropriately controlled by the circuit 28 so that each of them acts as a switch for passing the signal. The amplitude of this signal as "received" is then measured by the microprocessor 47 and is transmitted to Earth via its outlet 62 for calibrating instruments on Earth. This measured signal is indeed a signal that is suitable for calibrating the reception system 30 since it is equal to the signal as then initially re-transmitted via the link 73, which signal (as described above) is equal to a signal corresponding to the transmission power Pe attenuated a first time by C decibels and then transmitted over 24 via the coupler 70, and thus attenuated a second time by C decibels, after which it is amplified by the reception system 30 which is of gain Gr. Since the attenuation coefficient C is known and stable, the looked-for product Pe.Gr as required for calibration is thus equal to this signal as measured and as attenuated twice by the value of the coupling coefficient C (in decibels).

An additional feature of the calibration apparatus is being able to test the signal as transmitted and reflected to the receiver by mismatching of the antennas. This can be done merely by using the control circuit 28 to select an antenna for transmitting the calibration signal via that antenna. The losses in the switching matrix of circulators 25, 26, 27, 29, and 31, and the losses due to mismatching are thus tested.

Naturally, the invention is not limited to the embodiment described above, and numerous other embodiments of this satellite wind scatter meter may be envisaged.

Thus, the satellite 1 need illuminate only one swath. Also, in the more efficient case of having two swaths 6 and 7, the satellite could have three antennas per swath, i.e. six antennas in all, in which case it would not require electronic beam switching, or else it could have five antennas in all: two distinct rear aiming direction antennas 13, one for each of the swaths, two distinct antennas for front aiming 12, and a single middle antenna 3 for both middle aiming directions 11, in which case the middle antenna 3 needs to be an electronic beam switching antenna. The central transmission frequency may be selected to lie outside band C. The position and dimensional characteristics of a swath may be altered to obtain improved coverage as a function of the orbit of the satellite, etc.

I claim:

1. A satellite radar apparatus for measuring the backscatter coefficient of the sea to determine the speeds and the directions of winds at sea, the path of movement of said satellite with respect to earth defining a satellite earth track, and said satellite including a transmission system for transmitting a plurality of beams to earth defining at least one swath of beam coverage as said satellite moves along said satellite earth track, and a reception system for receiving signals reflected back to said satellite, said plurality of beams comprising:

a first beam along a first aiming direction and defining a middle earth track which lies in a first swath, is orthogonal to the satellite earth track and is situated in a vertical first plane passing through the satellite;

a second beam along a second aiming direction and defining a front earth track which lies in said first swath, is parallel to said middle earth track and is situated in a sloping second plane which passes through the satellite and is situated in front of the first plane as said satellite moves along said satellite earth track; and a third beam along a third aiming direction and defining a rear earth track which lies in said first swath, is parallel to said middle earth track and is situated in a sloping third plane which passes through the satellite and is situated behind the first plane as said satellite moves along said satellite earth track.

2. An apparatus according to claim 1, wherein said reception system comprises an echo signal reception system which comprises a first path for measuring received noise and a second path for measuring received "signal-plus-noise", said first and second paths being distinct from one another but operating at the same time.

3. An apparatus according to claim 1, wherein said apparatus uses a "pulse compression radar technique" wherein the satellite transmits to earth a "chirp" signal of determined duration and having linear frequency modulation, with an echo signal received by said apparatus being subjected on reception to on-board processing of the "matched filter" type, operating in a manner analogous to pulse compression in acoustic filters to perform mathematical correlation, i.e. a well-defined correlation, between said echo signal and the transmitted signal, said transmitted signal being itself delayed appropriately in time and optionally offset in frequency to compensate the Doppler effect.

4. An apparatus according to claim 2, including a noise measurement calibration system including means for generating two determined noise signals and for injecting these two noise signals into said first path.

5. An apparatus according to claim 1, including a sequential calibration assembly for calibrating the reception system by measuring the product of transmitted power multiplied by reception gain, said assembly including a servo-control loop which receives a small portion of the transmitted signal via a directional coupler provided at the output from a power amplifier for transmission, and which initially stores said small portion of the transmitted signal, and which subsequently, after receiving the echo and before the next transmission signal, likewise stores a calibrations signal identical to said transmission signal but preferably of lower power, which calibration signal is injected directly into said loop via a variable attenuator under the control thereof, with the attenuator thus being adjusted so that the two stored signals have the same amplitude, the attenuation of the attenuator then being equal to the coupling coefficient of said directional coupler such that the looked-for product is then given by multiplying the value of the power due to the calibration signal as measured at the end of the reception system after being injected directly into the reception system via the directional coupler by twice the value in decibels of said coupling coefficient of the directional coupler.

6. An apparatus according to claim 1, wherein said apparatus uses a pulse compression radar technique wherein the satellite transmits to earth a "chirp" signal of determined duration and having linear frequency modulation, and subjecting an echo signal on reception to on-board processing of the "matched filter" type which operates like acoustic pulse compression filters to perform mathematical correlation, i.e. well-defined correlation, between said echo signal and the transmitted signal itself appropriately adjusted in time and in frequency, wherein the apparatus includes a noise measuring calibration system which includes means for generating two determined noise signals and for injecting these two signals into the path for measuring noise.

7. A satellite radar apparatus for measuring the backscatter coefficient of the sea to determine the speeds and the directions of winds at sea, the apparatus including a sequential calibration assembly for reception system and a directional coupler provided at the output of a power amplifier for transmission purposes, wherein said calibration assembly operates by measuring the product of transmitted power multiplied by reception gain and includes a servo-control loop which receives a small fraction of the transmitted signal via the directional coupler and which begins by storing said small fraction, which continues after receiving the echo and before the next transmission signal by storing in like manner a calibration signal that is identical to said transmission signal but is preferably of lower power, which calibration signal is injected directly into the servo-control loop via a variable attenuator under the control of the loop, with the attenuator consequently being adjusted so that the two stored signals have the same amplitude, the attenuation of the attenuator then being equal to the coupling coefficient of the directional coupler, such that the looked-for product is given by multiplying the value of the power due to the calibration signal as measured at the end of the reception system after being injected into the reception system via said directional coupler by twice the value in decibels of said coupling coefficient of the directional coupler.

* * * * *